United States Patent
Olesen

(10) Patent No.: US 10,077,761 B2
(45) Date of Patent: Sep. 18, 2018

(54) IMPROVEMENTS RELATING TO WIND TURBINE SENSORS

(71) Applicant: VESTAS WIND SYSTEMS A/S, Aarhus N (DK)

(72) Inventor: Ib Svend Olesen, Randers (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 299 days.

(21) Appl. No.: 14/783,904

(22) PCT Filed: Apr. 10, 2014

(86) PCT No.: PCT/DK2014/050085
§ 371 (c)(1),
(2) Date: Oct. 12, 2015

(87) PCT Pub. No.: WO2014/166496
PCT Pub. Date: Oct. 16, 2014

(65) Prior Publication Data
US 2016/0053747 A1 Feb. 25, 2016

(30) Foreign Application Priority Data

Apr. 12, 2013 (DK) .................................. 2013 70208

(51) Int. Cl.
*F03D 17/00* (2016.01)
*H05B 3/10* (2006.01)
*F03D 11/00* (2006.01)
(Continued)

(52) U.S. Cl.
CPC .......... *F03D 11/0025* (2013.01); *F03D 7/042* (2013.01); *F03D 17/00* (2016.05);
(Continued)

(58) Field of Classification Search
CPC ...... F03D 11/0025; F03D 17/00; F03D 80/30; F03D 80/40; F03D 7/042
(Continued)

(56) References Cited

U.S. PATENT DOCUMENTS

| 2007/0272678 A1* | 11/2007 | Meyuchas | G06F 1/206 219/494 |
| 2008/0141768 A1* | 6/2008 | Ormel | F03D 80/40 73/170.07 |
| 2010/0221111 A1* | 9/2010 | Nieuwenhuizen | F03D 1/065 416/61 |

FOREIGN PATENT DOCUMENTS

| CN | 1077061 A | 10/1993 |
| CN | 1705823 A | 12/2005 |

(Continued)

OTHER PUBLICATIONS

Machine Translation JP2002-115217, 2002, Toyoda, Translation Performed Nov. 2017.*

(Continued)

*Primary Examiner* — Brian Jennison
(74) *Attorney, Agent, or Firm* — Patterson + Sheridan, LLP

(57) ABSTRACT

Improvements Relating to Wind Turbine Sensors A sensor apparatus for a wind turbine is described. The apparatus comprises a sensor and a heating system. The heating system comprises an optical fibre arranged to transmit electromagnetic radiation from a light source to the sensor. The sensor is irradiated by the electromagnetic radiation thereby heating the sensor and preventing or reducing ice accretion.

20 Claims, 3 Drawing Sheets

(51) Int. Cl.
  *F03D 7/04* (2006.01)
  *F03D 80/40* (2016.01)
  *F03D 80/30* (2016.01)

(52) U.S. Cl.
  CPC ............ *F03D 80/30* (2016.05); *F03D 80/40* (2016.05); *F05B 2260/20* (2013.01); *Y02E 10/72* (2013.01)

(58) Field of Classification Search
  USPC ........................................................ 219/583
  See application file for complete search history.

(56) References Cited

FOREIGN PATENT DOCUMENTS

| | | |
|---|---|---|
| CN | 101201413 A | 6/2008 |
| CN | 101548101 A | 9/2009 |
| CN | 101846750 A | 9/2010 |
| CN | 102297095 A | 12/2011 |
| CN | 202612005 U | 12/2012 |
| DE | 202006000816 U1 | 3/2006 |
| EP | 2154364 A1 | 2/2010 |
| JP | 2002115217 A | 4/2002 |
| WO | 9637405 A1 | 11/1996 |
| WO | 2010/136151 A2 | 12/2010 |
| WO | 2011/095170 A2 | 12/2010 |

OTHER PUBLICATIONS

International Search Report for PCT/DK2014/050085, dated Jul. 7, 2014.

Danish Search Report for PA 2013 70208, dated Nov. 26, 2013.

* cited by examiner

IMPROVEMENTS RELATING TO WIND TURBINE SENSORS

BACKGROUND

The present invention relates to wind turbine sensors.

Modern wind turbines include a number of sensors for monitoring external parameters such as wind speed and wind direction, and internal parameters such as vibration and strain affecting the wind turbine blades and other components. Information from these sensors is used for controlling the wind turbine and for monitoring the health of the wind turbine components.

Many wind turbine sensors are made from metallic components. However, as wind turbines are very tall structures and these sensors tend to be located externally at the top of the tower or on the rotating blades, they are susceptible to lightning strikes. To counter this problem a sensor made entirely from non-metallic components has been proposed in WO2011/095170. Alternatively, the sensors may comprise galvanic insulation to reduce the risk of lightning strikes.

Another problem affecting wind turbine sensors is ice accretion. In cold conditions ice may accumulate on the wind turbine blades and other parts of the wind turbine. If this ice covers the sensors it may prevent the sensors from operating effectively.

Against this background, the present invention aims to provide an improved sensor system that does not suffer from the problems described above.

SUMMARY OF THE INVENTION

According to the present invention there is provided a sensor apparatus for a wind turbine, the apparatus comprising: a sensor; and a heating system, wherein the heating system comprises an optical fibre arranged to transmit electromagnetic radiation from a light source to the sensor and irradiate the sensor with the electromagnetic radiation to heat the sensor and thereby preventing or reducing ice accretion on the sensor.

The sensor apparatus may further comprise a controller configured to activate the heating system in conditions that are conducive for ice accretion on the sensor. Low ambient air temperatures may cause ice accretion but other factors such as air humidity and air pressure may also influence whether ice accretion will occur.

In a preferred embodiment, the controller is configured to activate the heating system if a measured temperature falls below a predetermined threshold temperature. In order to prevent ice from forming on the sensor, the predetermined threshold temperature is preferably above ice-forming temperatures. The benefit of only activating the heating system below a threshold temperature is that power is conserved compared to having the heating system constantly active. In other embodiments, the controller may be configured to activate the heating system when the measured temperature falls below the threshold temperature and when the level of humidity exceeds a predetermined threshold.

Wind turbines usually include temperature sensors to measure the ambient temperature local to the wind turbine and, preferably, ambient temperature is the measured temperature referred to above.

Alternatively, the measured temperature may be the temperature of the sensor itself. In some cases, the ambient temperature may not accurately reflect the temperature of the sensor itself. Using the temperature of the sensor, it can be more accurately determined whether ice-forming temperatures are present at the sensor compared to when ambient temperature is used.

Preferably, the controller is configured to increase the power output of the heating system as the measured temperature decreases according to a predetermined relationship between the measured temperature and the power output of the heating system. More power is required to maintain the sensor apparatus temperature above ice-forming temperatures in colder conditions. Increasing the power output of the heating system in colder conditions therefore serves to conserve power by minimising the power required to maintain the sensor apparatus temperature above ice-forming temperatures, whilst at the same time ensuring that the heating system is fully-functional even in extremely cold conditions.

Alternatively or additionally, the controller may be configured to activate the heating system in response to identifying spurious sensor data indicative of the presence of ice on the sensor. This configuration is used to melt any ice that may have formed on the sensor. Ice accretion on the sensor may disrupt the normal operation of the sensor causing the sensor to provide spurious measurements. Any spurious measurements may be detected by the controller through statistical comparison of the measurements with typical measurements to find any significant outliers in the data. The control software may be configured to activate the heating system on receiving a predetermined number of spurious measurements within a predetermined time period, when the measured temperature is at or below ice-forming temperatures.

In a preferred embodiment, the light source of the heating system emits electromagnetic radiation with wavelength in the infrared range. Alternatively, the wavelength of the electromagnetic radiation may be in the visible range or indeed any other suitable range capable of providing a heating effect. The light source may comprise one or more LEDs, lasers, halogen, metal halide light sources or any other light source capable of providing a heating effect on the sensor when the electromagnetic radiation is transmitted via the optical fibre.

The electromagnetic radiation may be distributed over the sensor system from the end of the optical fibre of the heating system using an arrangement of lenses and/or mirrors. The beam of light emitted from the end of the optical fibre may be relatively narrow compared to the size of the sensor. The inclusion of at least one lens may therefore be beneficial in distributing the electromagnetic radiation over a wide area of the sensor in a shorter distance than would be possible without any lens. Further, components of the sensor may block electromagnetic radiation from the end of the optical fibre from reaching other parts of the sensor and at least one mirror could be used to reflect the electromagnetic radiation towards parts of the sensor that may otherwise be overshadowed.

Preferably all elements of the sensor apparatus that are to be mounted externally on a wind turbine are made from electrically-insulating materials. More specifically, all elements of the sensor apparatus to be mounted externally on the wind turbine are preferably made from non-metallic materials. This reduces the susceptibility of the sensor to lightning strikes. For example, a housing for the sensor apparatus may be constructed from a material such as plastic with reinforcements of glass or carbon fibres; alternatively the material may be a deformable material such as a polymer, for example rubber, natural rubber, polypropylene, polyethylene, nylon, elastomers, Kevlar, or the like.

It is advantageous if the light source is located remotely from the sensor as the light source contains electronic components and it is desirable not to add any metallic components to an externally mounted sensor apparatus for the reasons described above.

Similarly, it is preferable for all elements of the sensor apparatus that are susceptible to damage from electrical discharges or induced currents caused by lightning strikes to be protected by electrical shielding. For example, the electrical components could be located inside a Faraday cage to shield them from lightning strikes.

In embodiments comprising at least one mirror to distribute electromagnetic radiation over the sensor, the mirror is preferably a non-metallic mirror such as a dielectric mirror.

In embodiments where the measured temperature is the sensor temperature itself, the temperature sensor is preferably located remotely from the sensor and is a non-contact thermometer such as an infrared camera or infrared pyrometer. Again, this ensures that no metallic components are associated with the sensors that may attract lightning.

Preferably, the sensor has no metallic components or the sensor otherwise comprises galvanic insulation, non-limiting examples include an optical anemometer, an optical light meter or an optical strain gauge. An optical light meter can be used in a system to prevent shadow flicker caused by wind turbines. As each turbine blade rotates around the axis of the shaft, repetitive, strobing shadows may be cast when the sun is low in the sky, this phenomenon is known as 'shadow flicker'. Shadow flicker may cause undesirable and distracting lighting, especially if the wind turbine is located near residential areas. To counter this problem, some wind turbines include light meters that are able to provide information about the angle and position of the sun. This information is useful for monitoring the relative light levels on opposite sides of the wind turbine tower. Knowing the relative light levels allows the risk of shadow flicker to be calculated and this information can be used to control the wind turbine so as to avoid or reduce shadow flicker.

Preferably, the sensor apparatus described above is used on a wind turbine. Accordingly, the invention provides a wind turbine comprising the sensor apparatus described above. The sensor apparatus is both resistant to lightning strikes and prevents or reduces ice accretion. The invention also includes a wind farm comprising a plurality of wind turbines as described above.

Alternatively or additionally, the sensor apparatus described above could be used on meteorological measurement towers since sensors such as anemometers used on measurement towers are also susceptible to lightning strikes and ice accretion.

The invention further provides a method of reducing or preventing ice accretion on a wind turbine sensor, the method comprising heating the sensor by irradiating the sensor with electromagnetic radiation, wherein the electromagnetic radiation is transmitted from a light source to the sensor by an optical fibre.

In a preferred embodiment, the method may comprise measuring a temperature and heating the sensor if the measured temperature falls below a predetermined threshold temperature. Preferably, the method comprises increasing the intensity of the electromagnetic radiation transmitted to the sensor as the measured temperature decreases. Alternatively or additionally, the method may comprise heating the sensor in response to the identification of spurious sensor data indicative of the presence of ice on the sensor. Preferably, the method comprises irradiating the sensor with electromagnetic radiation with wavelength in the infrared range, although other wavelengths capable of providing a heating effect may be suitable. In a preferred embodiment of the method, the light source may be located remotely from the sensor.

BRIEF DESCRIPTION OF THE DRAWINGS

In order that the invention may be more readily understood, embodiments of the invention will now be described in more detail, by way of example only, and with reference to the following figures in which.

DETAILED DESCRIPTION OF THE PREFERRED EMBODIMENTS

Figure 1:
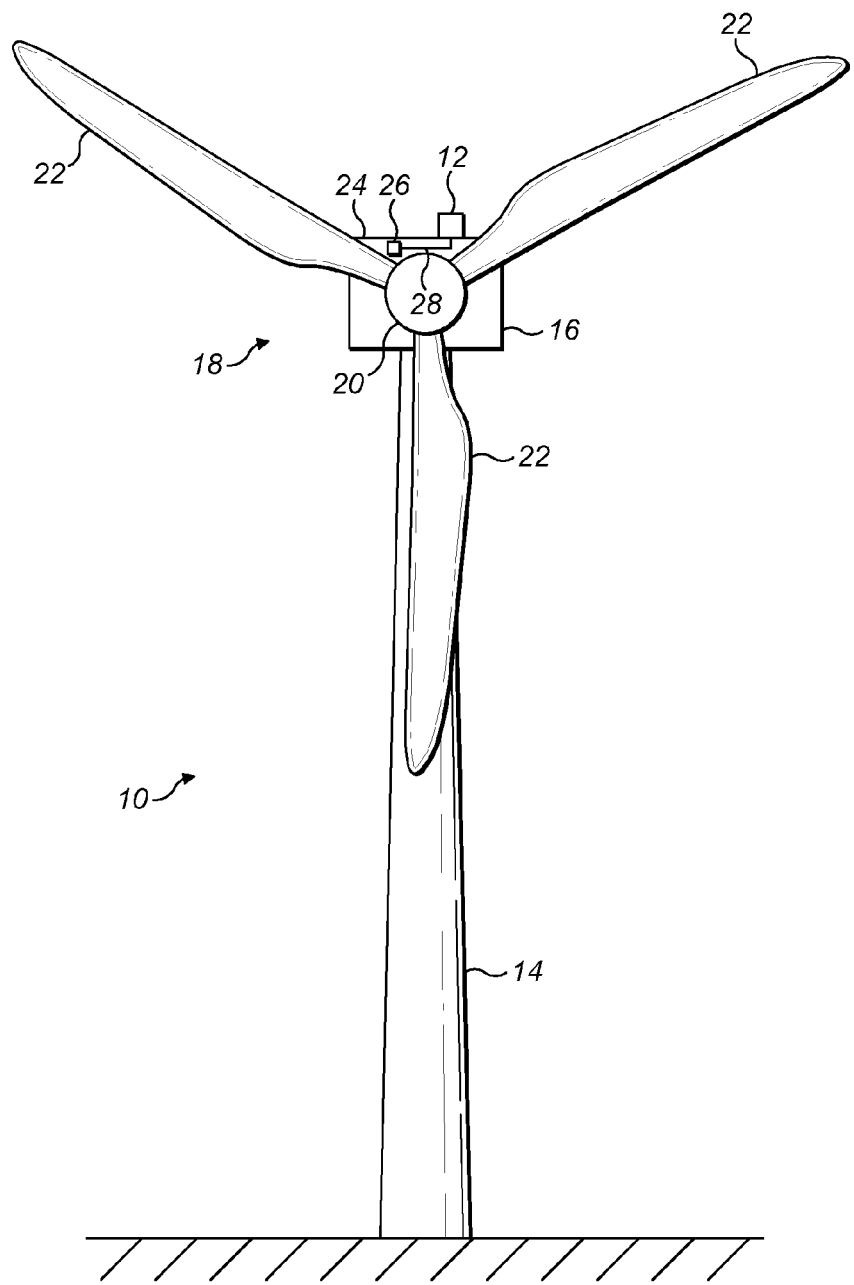
FIG. 1 is a schematic view of a wind turbine according to the present invention.

FIG. 1 shows a wind turbine 10 having a sensor apparatus 12 according to an embodiment of the invention. The wind turbine 10 comprises a tower 14 on which a nacelle 16 is supported. A rotor 18 is mounted to the front of the nacelle 16. The rotor 18 comprises a hub 20 on which three equally-spaced rotor blades 22 are mounted. The sensor apparatus 12 is mounted externally on an upper surface 24 of the nacelle 16. The nacelle 16 comprises electrical shielding, such as a Faraday cage, to protect its contents against lightning strikes. An optoelectronic equipment suite 26 is located within the electrically shielded nacelle 16 and connected to the sensor apparatus 12 by a bundle of optical fibres, as shown schematically by the line 28 in FIG. 1. In alternative embodiments, both the sensor apparatus 12 and the optoelectronic equipment suite 26 could be located elsewhere on the wind turbine 10.

Figure 2:
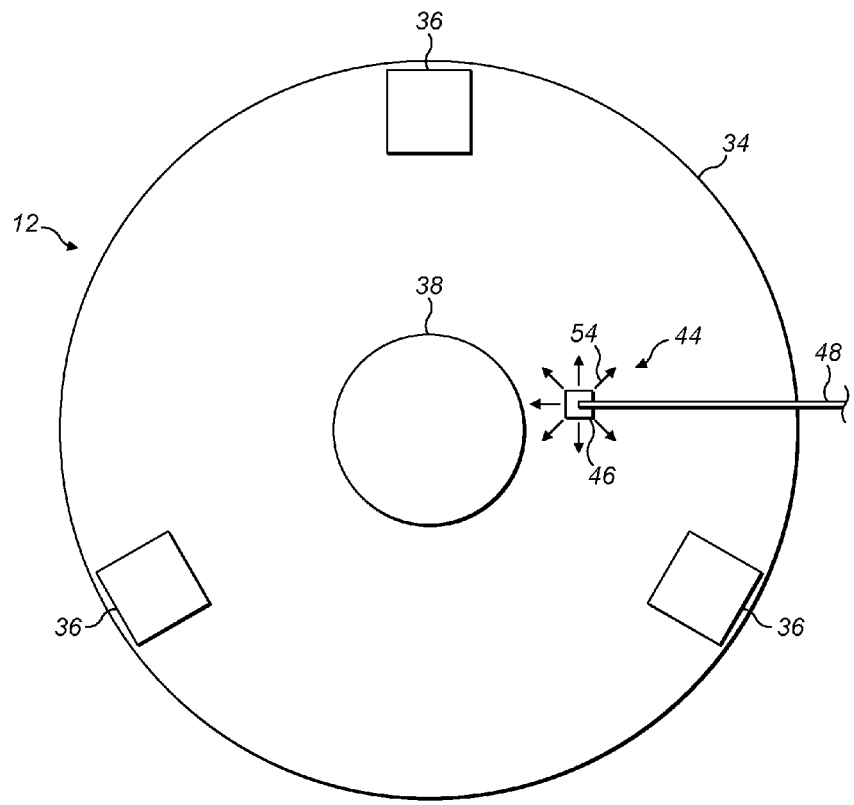
FIG. 2 is a schematic plan view of a wind turbine sensor apparatus according to an embodiment of the present invention.
Figure 3:
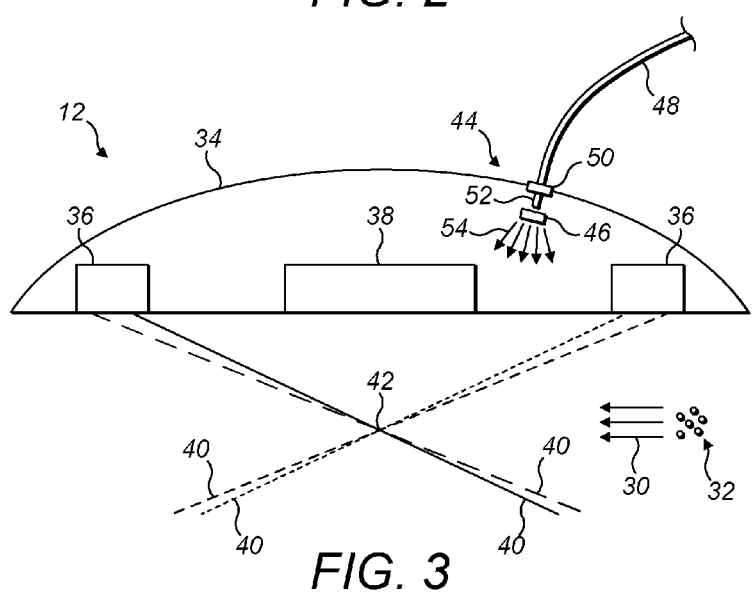
FIG. 3 is a schematic side elevation view of the sensor apparatus of FIG. 2.

Referring now to FIGS. 2 and 3, the sensor apparatus 12 comprises a sensor. In this example, the sensor is an optical anemometer configured to determine the speed and the direction of the wind 30 by detecting the motion of dust particles 32 or other such matter carried in the wind. The operation of the optical anemometer will be discussed in more detail later.

The optical anemometer includes a dome-shaped housing 34 in which three light sources 36 and a light detection apparatus 38 are located. The light detection apparatus 38 is centrally located in the housing 34 and the three light sources 36 are equally-spaced around the light detection apparatus 38. The light sources 36 emit beams of light 40 that converge in a focal region 42 below the light detection apparatus 38.

The sensor apparatus 12 further comprises a heating system 44 to prevent or reduce ice accretion on the optical anemometer. The heating system 44 comprises a lens 46 and an optical fibre 48. The housing 34 has a first aperture 50 through which a first end of the optical fibre 52 enters the housing 34. The lens 46 is mounted inside the housing 34, adjacent to and spaced apart from the first end of the optical fibre 52. As will be described in more detail later, the heating system 44 functions using the lens 46 to distribute infrared radiation 54 emitted from the first end of the optical fibre 52 over the sensor apparatus 12.

In this embodiment, the sensor apparatus 12 does not contain any metallic or electrically conductive components and is therefore less vulnerable to lightning strikes than a sensor apparatus having metallic components.

Figure 4:
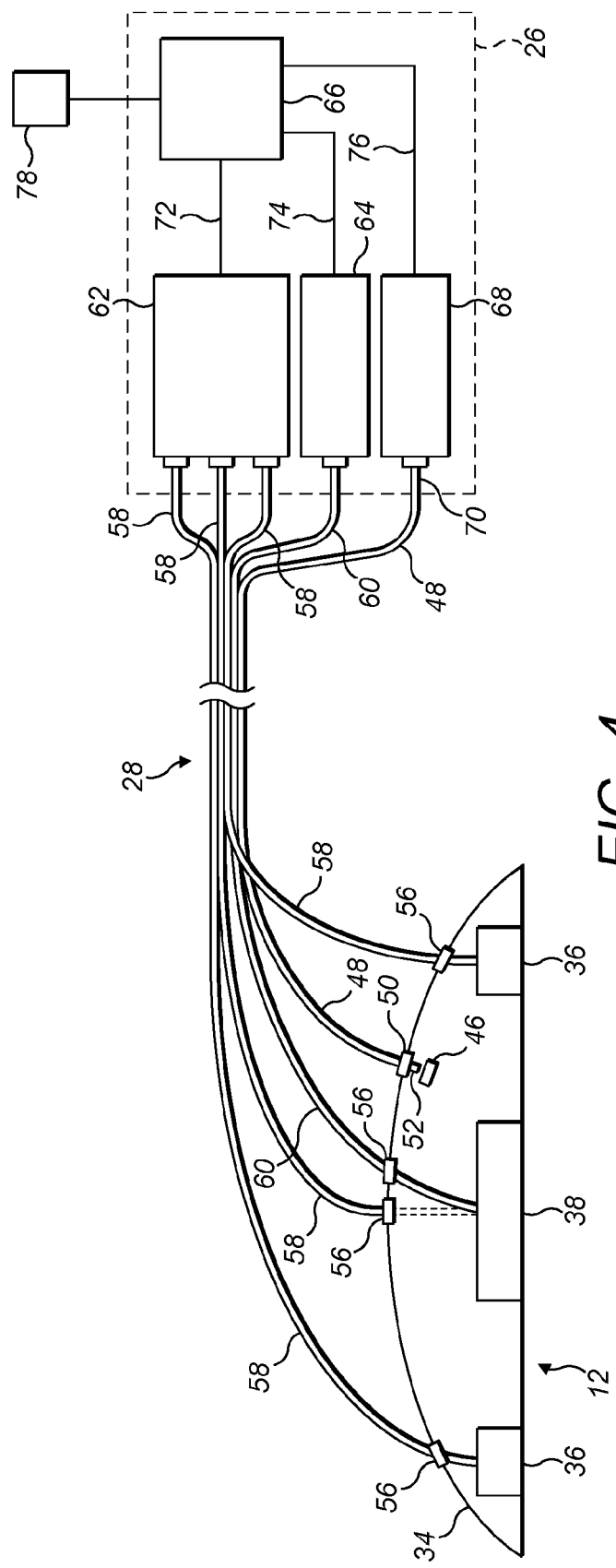
FIG. 4 shows the sensor apparatus of FIG. 2 in more detail and connected to an optoelectronic equipment suite.

FIG. 4 shows the housing 34 in this embodiment with five apertures 50, 56 through which five optical fibres 48, 58, 60 enter the housing 34. The first aperture 50 and optical fibre 48 are as described above and illustrated in FIG. 3. Additionally, each of the three light sources 36 (one of which is not visible in this side view) is connected to its own optical fibre 58. Similarly, the light detection apparatus 38 is connected to an optical fibre 60. Outside the housing, the optical fibres 48, 58, 60 are grouped together to form the bundle 28 referred to above. The optical fibre bundle 28 passes into the interior of the nacelle 16 to the optoelectronic equipment suite 26. In other embodiments, the optical fibres 48, 58, 60 may be grouped into a bundle within the housing 12 and pass through a single aperture in the housing.

The optoelectronic equipment suite 26 inside the nacelle 16 comprises an optoelectronic light source 62, a light detector 64 such as a photo diode, a controller 66 and an infrared optoelectronic light source 68. The optical fibres 58 connected to the three light sources 36 in the sensor housing 34 are each connected at their other ends to the optoelectronic light source 62 in the optoelectronic equipment suite 26. Similarly, the optical fibre 60 connected to the light detection apparatus 38 in the housing 34 is connected at its other end to the light detector 64 in the optoelectronic equipment suite 26, and the optical fibre 48 of the heating system 44 in the sensor housing 34 is connected at a second end 70 to the infrared optoelectronic light source 68 in the optoelectronic equipment suite 26. The controller 66 has respective connections 72, 74, 76 to the optoelectronic light source 62, the infrared optoelectronic light source 68 and the light detector 64. The controller 66 is also connected to a temperature sensor 78 located outside the optoelectronic equipment suite 26.

In this embodiment, both the optoelectronic light source 62 and the infrared optoelectronic light source 68 comprise a plurality of LEDs. Specifically, the optoelectronic light source 62 emits visible electromagnetic radiation and the infrared optoelectronic light source 68 emits electromagnetic radiation having a wavelength in the infrared range.

The controller 66 includes a memory on which control software is stored and a processor to run the control software. The control software governs the operation of both the optical wind sensor and the heating system 44. The controller 66 is also configured to receive ambient temperature information from the temperature sensor 78.

Referring to FIGS. 3 and 4, the light sources 36 and light detection apparatus 38 are substantially arranged as described in WO2011/095170 to determine the speed and direction of the wind 30 based upon the speed and direction of travel of dust particles 32 carried in the wind. The reader is referred to WO2011/095170 for a detailed description of the mode of operation of the sensor. However, for convenience, a brief description of the operation is provided below.

Each of the three light sources 36 (one of which is not visible in the side views of FIGS. 3 and 4) emits two beams of light 40 with distinct wavelengths. The light detection apparatus 38 receives flashes of light caused as the dust particles 32 carried in the wind 30 pass through the individual beams of emitted light 40 and reflect light towards the light detection apparatus 38. The flashes of light are transmitted from the light detection apparatus 38 to the light detector 64 in the optoelectronic equipment suite 26 via the associated optical fibre 60. The flashes of light are processed by the controller 66 to determine the speed and/or direction of the motion of the dust 32 and hence the speed and/or direction of the wind 30 in which the dust 32 is carried. The controller 66 also uses the order in which the distinct wavelengths of light are reflected to determine the direction of motion of the dust particles 32.

Referring still to FIGS. 3 and 4, the operation of the heating system 44 will now be discussed in more detail. In addition to the lens 46 and adjacent optical fibre 48 described above, the heating system 44 further comprises the infrared optoelectronic light source 68 in the optoelectronic equipment suite 26. The heating system 44 is arranged such that infrared light 54 emitted from the infrared optoelectronic light source 68 is transmitted via the optical fibre 48 and distributed via the lens 46 over the sensor apparatus 12. The sensor apparatus 12 absorbs the infrared light 54 and converts the energy of the infrared light 54 into heat. The heat absorbed by the sensor apparatus 12 is sufficient to prevent or reduce ice accretion on the sensor apparatus 12. This enables the sensor apparatus 12 to continue to operate even in low ambient temperatures which would usually cause ice accretion on the sensor apparatus 12.

In this embodiment, the system is configured to prevent ice from forming on the sensor. Hence when the temperature sensor 78 indicates that the ambient temperature has fallen below a predetermined threshold that is above ice-forming temperatures the controller 66 activates the heating system 44. In this example, the predetermined threshold is set at +1° C. This leads to the heating system 44 irradiating the sensor apparatus 12 with infrared light 54 to ensure that the temperature of the sensor apparatus remains above ice-forming temperatures, thereby preventing ice accretion on the sensor apparatus 12.

The control software is configured to prevent the heating system 44 from interfering with the operation of the sensor apparatus 12. When the heating system 44 is activated, the emitted infrared light 54 may be reflected or transmitted around the inside of the housing 34 and transmitted to the optoelectronic equipment suite 26 through the optical fibre 60 connected to the light detector 64. Any infrared light consequentially received by the light detector 64 is filtered out by the control software, which uses algorithms to remove signals resulting from wavelengths in the infrared range.

The control software further defines a predetermined relationship between ambient temperature and power output of the infrared optoelectronic light source 68 where the power output of the infrared optoelectronic light source 68 generally increases with decreasing ambient temperature so that the sensor apparatus 12 is heated more as temperature falls. The predetermined relationship between ambient temperature and power output of the infrared optoelectronic light source 68 serves to conserve power by minimising the power required to maintain the sensor apparatus 12 temperature above ice-forming temperatures, whilst at the same time ensuring that the heating system 44 is fully-functional even in extremely cold conditions.

In alternative embodiments, the heating system 44 could be used to melt ice rather than to prevent ice forming. If ice accretion has occurred, the sensor apparatus 12 may provide spurious wind speed and wind direction measurements. Any spurious measurements are detected by the controller 66 through statistical comparison of the measurements with typical measurements to find any significant outliers in the data. The control software is configured to activate the heating system 44 on receiving a predetermined number of spurious measurements within a predetermined time period, if the temperature sensor also indicates ice-forming ambient temperatures. The heating system 44 then irradiates the sensor apparatus 12 with infrared light 54, melting any ice on the sensor apparatus 12.

Many modifications may be made to the above examples without departing from the scope of the present invention as defined in the accompanying claims.

For example, the optoelectronic light source 62 and the infrared optoelectronic light source 68 need not be integrated into the same optoelectronic equipment suite. In alternative embodiments, a standalone sensor heating optoelectronic equipment suite may be connected to the optical fibre 48 adjacent to the lens 46 in the housing 34. The sensor heating optoelectronic equipment suite may contain the infrared optoelectronic light source 68, the temperature sensor 78 and a dedicated controller.

Whilst a temperature threshold of +1° C. is used in the above examples, a different temperature threshold may be employed in other examples. For example, a lower temperature threshold may be employed in cases where air humidity is low. The apparatus may further comprise means for measuring air humidity, and the heating system 44 may only be activated when temperature falls below a predetermined threshold and air humidity exceeds a predetermined threshold. Alternatively, the predetermined threshold temperature below which the heating system is activated may be calculated on the basis of an air humidity value (either measured or otherwise provided) and/or other potentially relevant factors such as air pressure.

The temperature sensor 78 in the embodiment described above is configured to measure ambient temperature and could include a thermocouple, thermistor, analogue temperature sensor or digital temperature sensor. However, the ambient temperature can only be used to infer whether ice-forming temperatures are present at the sensor apparatus 12 itself. Therefore, in other embodiments, the temperature sensor 78 may be a non-contact thermometer, such as an infrared pyrometer, configured to measure the temperature of the sensor apparatus directly. In such embodiments, the controller 66 uses the sensor apparatus temperature in the same way as ambient temperature as described above to prevent or reduce ice accretion on the sensor apparatus 12. The benefit of this is that the sensor apparatus temperature is measured directly without increasing the vulnerability of the sensor apparatus 12 to lightning strikes because the temperature measurement equipment does not require metallic parts to be associated with the sensor apparatus 12.

In the embodiment described above, one lens 46 is used to distribute the electromagnetic radiation from the first end of the optical fibre 52 of the heating system 44. However, depending on the configuration of the sensor apparatus 12, one or more lenses and/or mirrors may be employed to distribute the electromagnetic radiation from the first end of the optical fibre over the sensor apparatus.

Whilst single optical fibres have been described above for convenience, in practice bundles of optical fibres, such as in a fibre optic cable, may be used to increase the transmission of electromagnetic radiation and for redundancy purposed making the apparatus more robust.

What is claimed is:

1. A sensor apparatus for a wind turbine, the apparatus comprising:
   an optical sensor that detects light of a first wavelength; and
   a heating system, comprising:
      a light source that produces electromagnetic radiation of a second wavelength different from the first wavelength; and
      an optical fiber, connected to the light source to transmit the electromagnetic radiation from the light source to the optical sensor and irradiate the optical sensor with the electromagnetic radiation to heat the optical sensor and thereby reduce ice accretion on the optical sensor without interfering with the optical sensor detecting the light of the first wavelength.

2. The sensor apparatus of claim 1, further comprising a controller, comprising a processor and a memory including instructions for control software thereon that when executed by the processor activate the heating system when a measured temperature falls below a predetermined threshold temperature.

3. The sensor apparatus of claim 2, wherein the controller is further configured to increase a power output of the heating system as the measured temperature decreases according to a predetermined relationship between the measured temperature and the power output of the heating system.

4. The sensor apparatus of claim 2, wherein the controller is further configured to activate the heating system in response to identifying spurious sensor data indicative of ice being present on the optical sensor.

5. The sensor apparatus of claim 1, wherein the light source produces the electromagnetic radiation with a wavelength in the infrared range.

6. The sensor apparatus of claim 1, wherein the light source is located a predetermined distance from the sensor, wherein the optical fiber is of a length at least as long as the predetermined distance.

7. The sensor apparatus of claim 1, further comprising at least one lens and at least one mirror for distributing the electromagnetic radiation over the optical sensor.

8. The sensor apparatus of claim 1, wherein the sensor apparatus is made solely from electrically insulating materials.

9. The sensor apparatus of claim 1, wherein the sensor apparatus is made solely from non-metallic materials.

10. The sensor apparatus of claim 1, wherein the sensor apparatus is protected by electrical shielding from electrical discharges and induced currents.

11. The sensor apparatus of claim 1, wherein the optical sensor is an optical anemometer.

12. A wind turbine comprising the sensor apparatus as claimed in claim 1.

13. A wind farm comprising a plurality of wind turbines as claimed in claim 12.

14. A method of reducing ice accretion on an optical sensor, the method comprising:
   detecting, by the optical sensor, electromagnetic radiation of a first wavelength; and
   heating the optical sensor by irradiating the optical sensor with electromagnetic radiation of a second wavelength different from the first wavelength, wherein the electromagnetic radiation of the second wavelength is transmitted from a light source to the optical sensor by an optical fiber and the optical sensor detects the electromagnetic radiation of the first wavelength without interference from the electromagnetic radiation of the second wavelength.

15. The method of claim 14, further comprising measuring a temperature and in response to the measured temperature falling below a predetermined threshold temperature, transmitting the electromagnetic radiation of the second wavelength via the optical fiber to the optical sensor.

16. The method of claim 15, further comprising increasing an intensity of the electromagnetic radiation of the second wavelength transmitted to the optical sensor as the measured temperature decreases.

17. The method of claim 14, further comprising transmitting the electromagnetic radiation of the second wavelength via the optical fiber to the optical sensor in response to identification of spurious sensor data indicative of ice being present on the optical sensor.

18. The method of claim 14, the second wavelength is in the infrared range.

19. The method of claim 14, wherein the light source is located at least a length of the optical fiber from the optical sensor.

20. The sensor apparatus of claim 1, wherein the optical sensor filters out the second wavelength from the light detected.

* * * * *